(12) United States Patent
Yang et al.

(10) Patent No.: US 7,061,776 B2
(45) Date of Patent: *Jun. 13, 2006

(54) HALF-BRIDGE FLYBACK POWER CONVERTER

(75) Inventors: Ta-yung Yang, Milpitas, CA (US); Song-Yi Lin, Taipei (TW); Pei-Hsuan Cheng, Taipei (TW)

(73) Assignee: System General Corp., Taipei Hsien (TW)

( * ) Notice: Subject to any disclaimer, the term of this patent is extended or adjusted under 35 U.S.C. 154(b) by 38 days.

This patent is subject to a terminal disclaimer.

(21) Appl. No.: 10/889,849

(22) Filed: Jul. 12, 2004

(65) Prior Publication Data

US 2006/0007711 A1    Jan. 12, 2006

(51) Int. Cl.
*H02M 3/335*    (2006.01)
(52) U.S. Cl. .......................... 363/16; 363/17; 363/132; 363/40
(58) Field of Classification Search .................. 363/16, 363/17, 21.01, 21.02, 21.12, 21.15, 39, 40, 363/98, 132
See application file for complete search history.

(56) References Cited

U.S. PATENT DOCUMENTS

| | | | | | |
|---|---|---|---|---|---|
| 5,621,623 | A | * | 4/1997 | Kuriyama et al. | ............ 363/20 |
| 6,031,748 | A | * | 2/2000 | Hong | ....................... 363/21.12 |
| 6,507,500 | B1 | * | 1/2003 | Liang | ........................... 363/16 |
| 6,538,906 | B1 | * | 3/2003 | Ke et al. | ................. 363/21.02 |
| 6,717,827 | B1 | * | 4/2004 | Ota | .......................... 363/21.12 |
| 6,952,354 | B1 | * | 10/2005 | Yang et al. | .................... 363/16 |

* cited by examiner

*Primary Examiner*—Jessica Han
(74) *Attorney, Agent, or Firm*—J.C. Patents

(57) ABSTRACT

A half-bridge flyback power converter is provided. The half-bridge flyback power converter comprises a high-side switch and a low-side switch periodically conducting an input voltage to a primary winding of a transformer. When the high-side switch and the low-side switch are switched off, energy stored in the transformer is transmitted to a secondary circuit and serves to charge a bulk capacitor. A forward diode facilitates to combine the input voltage with a voltage across the bulk capacitor for powering the secondary circuit. Therefore, the power consumption of the leakage inductance is reduced and circuit topology is simplified.

6 Claims, 5 Drawing Sheets

HALF-BRIDGE FLYBACK POWER CONVERTER

BACKGROUND OF THE INVENTION

1. Field of Invention

The present invention relates to a power converter, and more particularly to a flyback power converter using half-bridge structure.

2. Description of the Related Art

Power converters have been used to convert an unregulated power source to a regulated voltage or a regulated current. Referring to FIG. 1, it illustrates a schematic circuit diagram of a conventional flyback power converter. A transistor 15 controlled by a control signal PWM switches a transformer 50 to transmit the power from the primary-side of the transformer 50 to a secondary circuit and to regulate an output voltage $V_O$. A capacitor 42 and a snubber resistor 41 are used to store and consume energy of a leakage inductor of the transformer 50. The energy of the leakage inductor of the transformer 50 must be completely dissipated; otherwise, a drain voltage of the transistor 15 will be continuously increased until the energy of the leakage inductor is fully dissipated by the snubber resistor 41. The energy therein is given as, $$\frac{V_{R41}^2}{R_{41}} = \frac{1}{2} \times L_l \times I_P^2 \times f \qquad (1)$$

where $V_{R41}$ is the voltage across the snubber resistor 41; $R_{41}$ is the resistance of the snubber resistor 41; f is the switching frequency.

One of the drawbacks of the conventional flyback power converter is that the leakage inductor of the transformer 50 consumes considerable power and thus reduces the efficiency of the power converter. Besides, an operating voltage $V_{DS}$ of the transistor 15 is increased because of the energy involving the leakage inductance, to which the voltage $V_{R41}$ adds the operating stress of the transistor 15 ($V_{DS}=V_{IN}+V_{R41}$). Another drawback of the conventional flyback power converter is a NTC (negative temperature coefficient) thermistor 11 that is disposed for to restricting an inrush current of the flyback power converter. When the flyback power converter is turned on, an inrush current is induced when charging the capacitor 18. The inrush current reduces reliability of the flyback power converter. In addition, the NTC thermistor 11 increases the power consumption and operating temperature of the flyback power converter.

Therefore, it is desirable to improve the efficiency of the flyback power converter by eliminating the necessity of the thermistor and reducing the power consumption by the leakage inductor of the transformer. Furthermore, it is also desirable to reduce the operating stress of the power converter for higher reliability.

SUMMARY OF THE INVENTION

The present invention is directed to a half-bridge flyback power converter. Energy stored in a leakage inductor of a transformer is recycled for powering a secondary circuit. No snubber component is required for dissipating the energy in the leakage inductor. Furthermore, thermistor is inessential in the present invention since no inrush current is generated. Therefore, efficiency and reliability of the power converter in the present invention is substantially improved. According to one embodiment of the present invention, the half-bridge flyback power converter includes a transformer having a primary winding coupled in series with a high-side switch and a low-side switch. The transformer further comprises a secondary winding coupled to the secondary circuit. The high-side switch and the low-side switch periodically conduct an input voltage to the primary winding of the transformer controlled by specific control signals. When the high-side switch and the low-side switch are switched off, the magnetized energy stored in the transformer is transmitted to the secondary circuit and serves to charge a bulk capacitor via two flyback diodes. Meanwhile, the energy in the leakage inductor is stored in the bulk capacitor as well. Since no path is provided between the input voltage and the bulk capacitor, no inrush current will be generated. A forward diode facilitates combination of the input voltage and the voltage of the bulk capacitor for transmitting the power to the secondary circuit.

DESCRIPTION OF THE EMBODIMENTS

Figure 1:
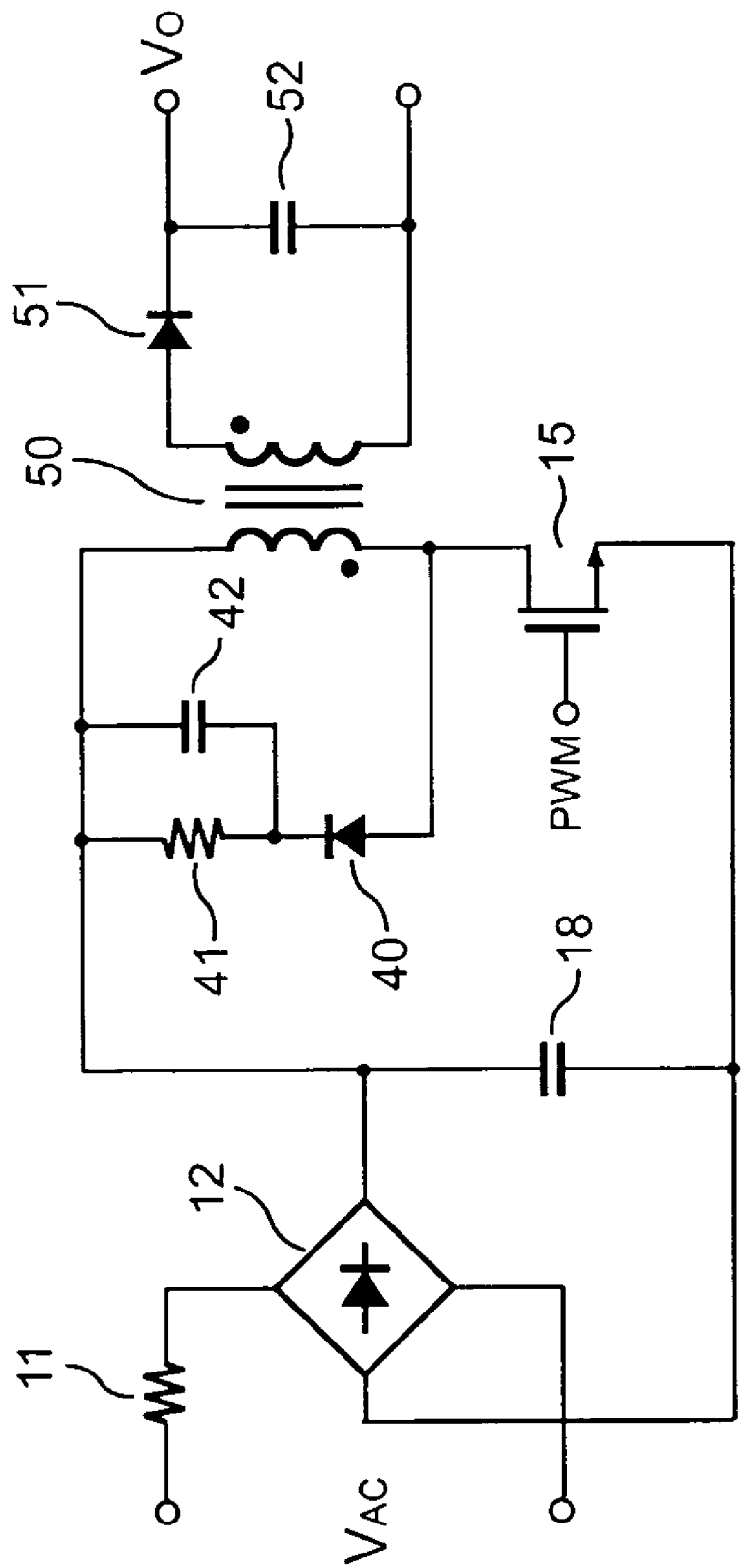
FIG. 1 is a schematic circuit diagram illustrating a conventional flyback power converter.
Figure 2:
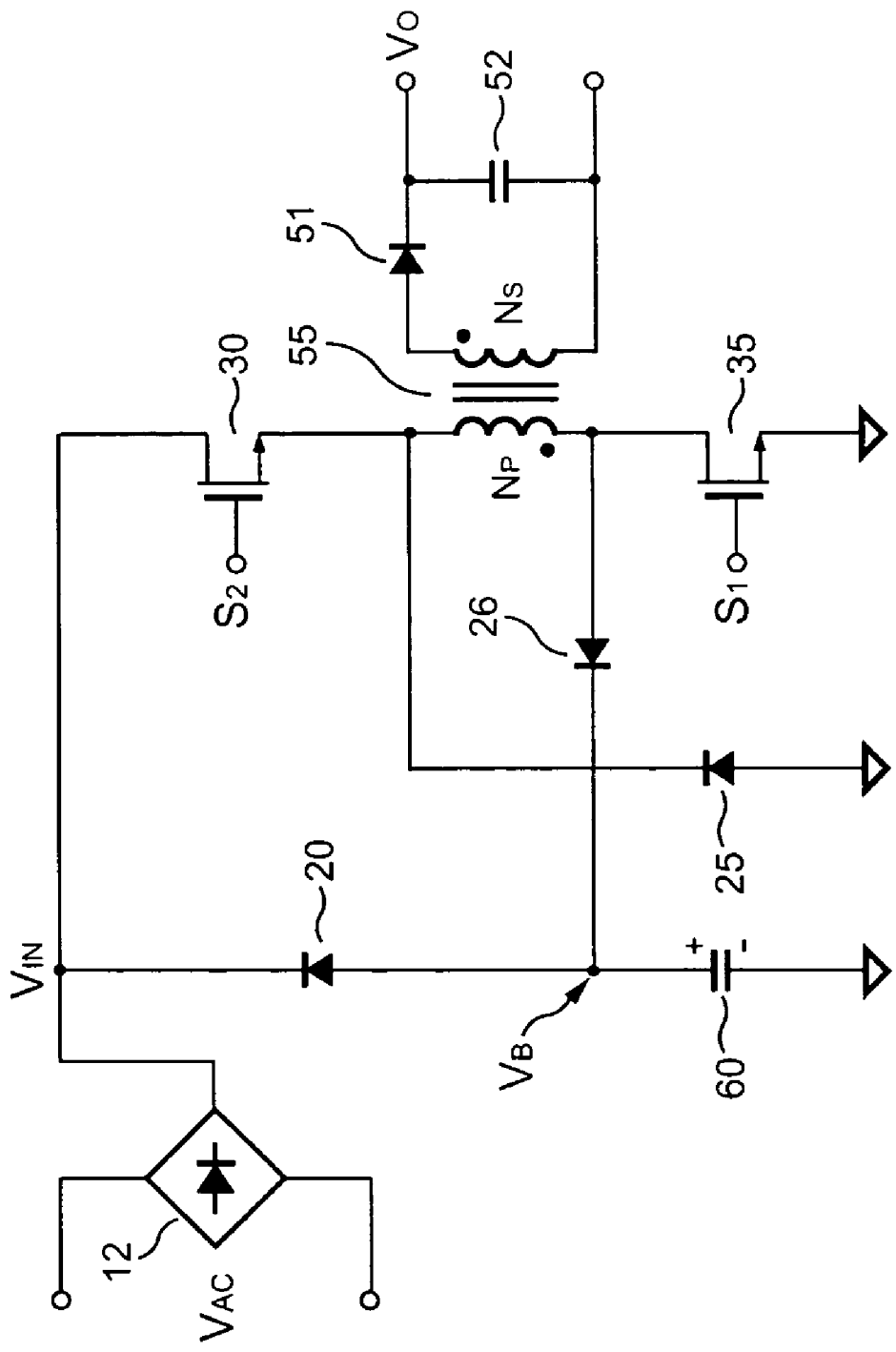
FIG. 2 is a schematic circuit diagram illustrating a half-bridge flyback power converter according one embodiment of the present invention.

Referring to FIG. 2, it illustrates a schematic circuit diagram of a half-bridge flyback power converter according to one embodiment of the present invention. The half-bridge flyback power converter comprises a transformer 55 having a primary winding $N_P$ and a secondary winding $N_S$, a secondary circuit, a high-side switch 30 and a low-side switch 35, flyback diodes 25 and 26, a forward diode 20 and a bulk capacitor 60. An input voltage $V_{IN}$ is supplied from a bridge rectifier 12, or from a DC voltage source, for example. The high-side switch 30 is coupled between the input voltage $V_{IN}$ and a second terminal of the primary winding $N_P$. A first terminal of the primary winding $N_P$ is coupled to a terminal of the low-side switch 35. Another terminal of the low-side switch 35 is coupled to a ground reference level. The secondary winding $N_S$ of the transformer 55 is coupled to the secondary circuit. The secondary circuit includes an output rectifier 51 and an output capacitor 52. The output rectifier 51 has an anode coupled to a first terminal of the secondary winding $N_S$. The output capacitor 52 is coupled from a cathode of the output rectifier 51 to a second terminal of the secondary winding $N_S$. The output capacitor 52 is also coupled in parallel with output terminal pairs of the half-bridge flyback power converter.

The first terminal of the primary winding $N_P$ and the first terminal of the secondary winding $N_S$ have the same polarity. The high-side switch 30 and the low-side switch 35 periodically conduct the input voltage $V_{IN}$ to the primary winding $N_P$ of the transformer 55 in response to control signals $S_2$ and $S_1$ respectively. When the input voltage $V_{IN}$ is applied to the primary winding $N_P$, the magnetized energy $\epsilon_P$ is thus stored in the transformer 55. The magnetized energy $\epsilon_P$ is given by, $$\varepsilon_P = \frac{1}{2} \times L_P \times I_P^2 \tag{2}$$

Figure 3A:
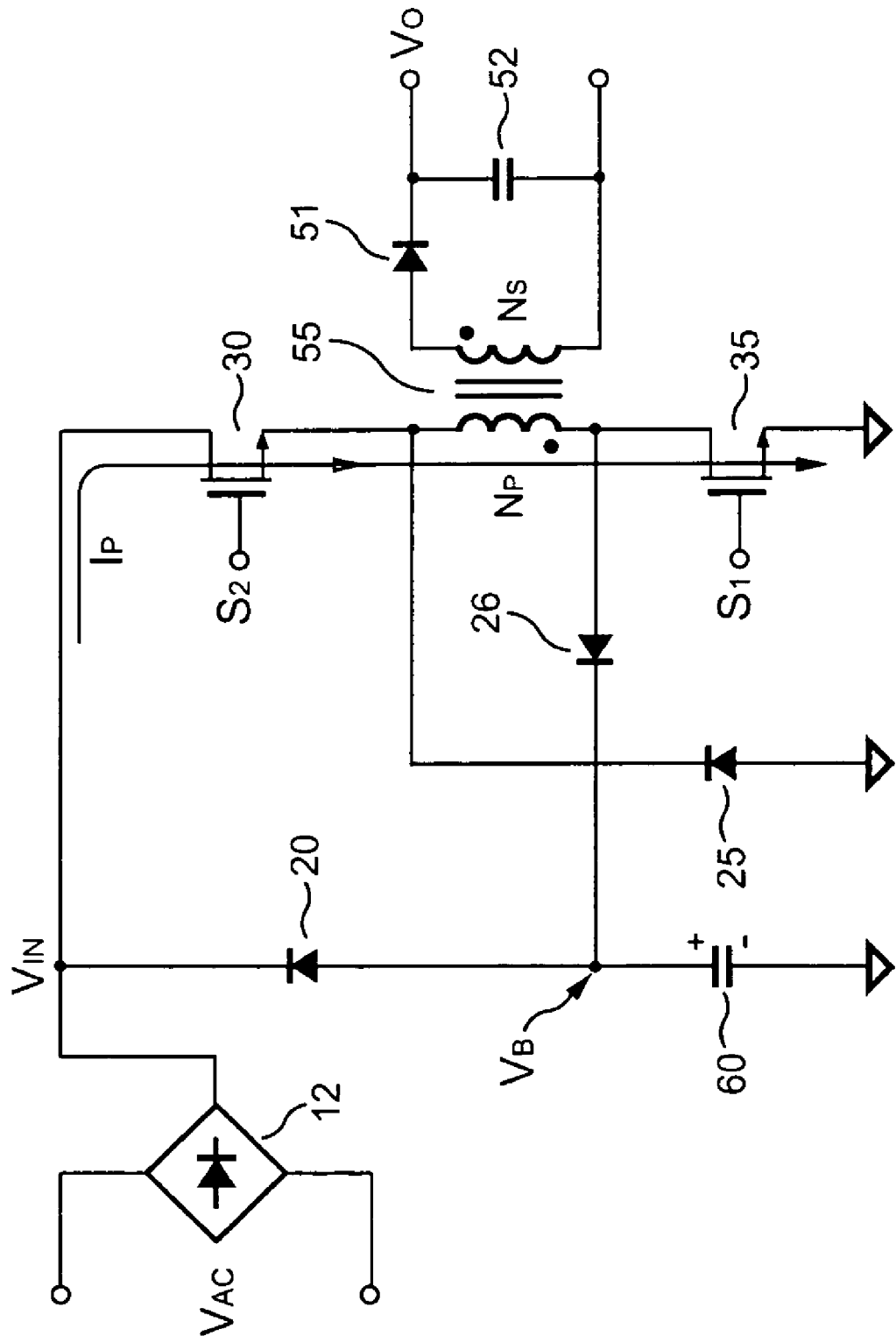
FIG. 3a is a schematic circuit diagram illustrating an operation of a half-bridge flyback power converter when a high-side switch and a low-side switch thereof are switched on according to one embodiment of the present invention.

Referring to FIG. 3a, it illustrates a schematic circuit diagram of the half-bridge flyback power converter where the transformer 55 is operatively magnetized by a primary current $I_P$ when the high-side switch 30 and the low-side switch 35 are switched on. In the mean time, a leakage inductor energy $\epsilon_I$ is stored in the leakage inductor $L_I$ of the transformer 55. The leakage inductor $L_I$ is associated with a magnetic flux that is not transmittable to the secondary side of the transformer 55. The leakage inductor energy $\epsilon_I$ is given by, $$\varepsilon_I = \frac{1}{2} \times L_I \times I_P^2 \tag{3}$$

In FIG. 3a, an anode of the flyback diode 25 is coupled to the ground reference level. A cathode of the flyback diode 25 is coupled to the second terminal of the primary winding $N_P$. A positive terminal of the bulk capacitor 60 is coupled to a cathode of the flyback diode 26. An anode of the flyback diode 26 is coupled to the first terminal of the primary winding $N_P$. A negative terminal of the bulk capacitor 60 is coupled to the ground reference level. A cathode of the forward diode 20 is coupled to the input voltage $V_{IN}$. An anode of the forward diode 20 is coupled to the positive terminal of the bulk capacitor 60.

Figure 3B:
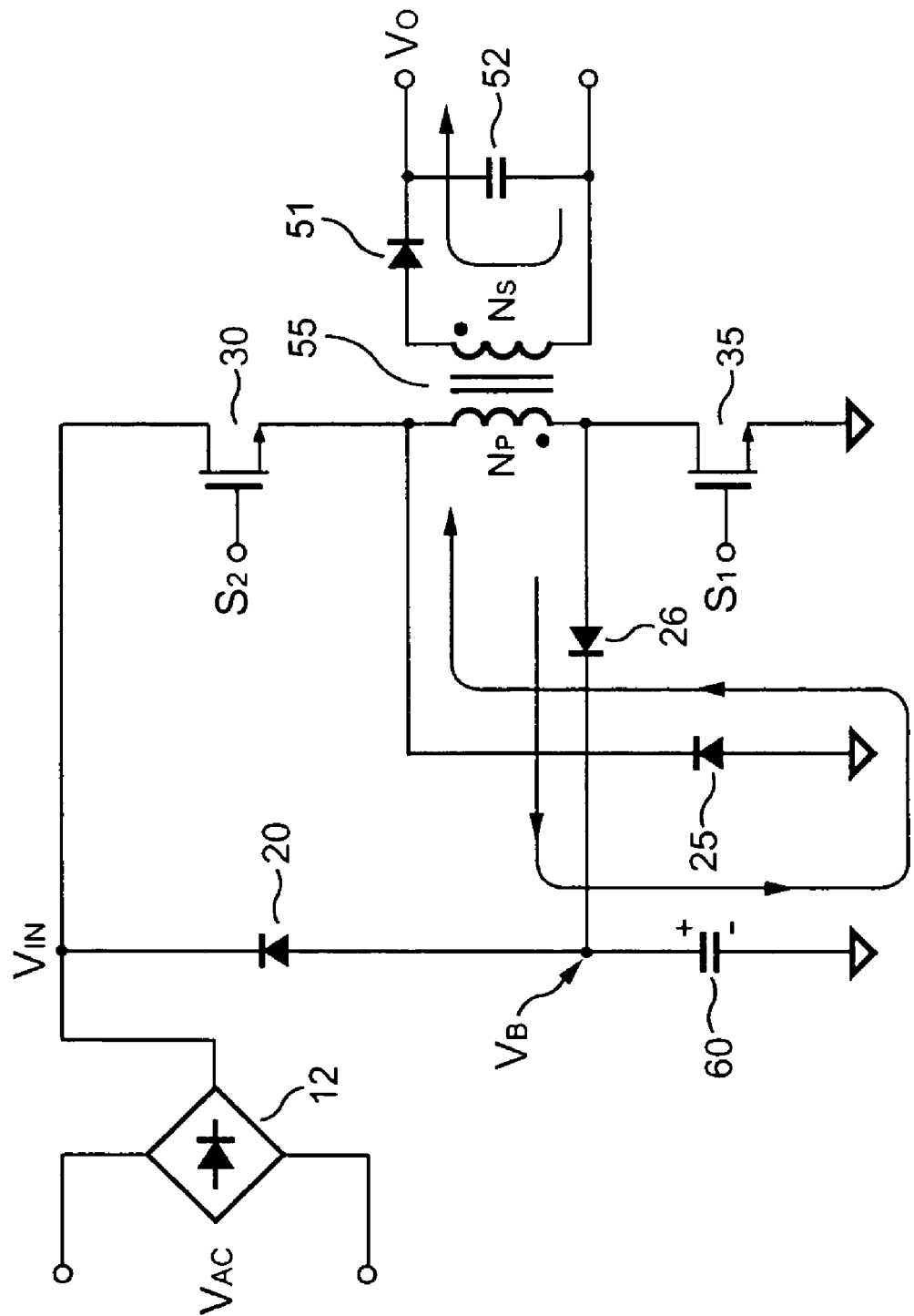
FIG. 3b is a schematic circuit diagram illustrating an operation of a half-bridge flyback power converter when the high-side switch and the low-side switch are switched off according to one embodiment of the present invention.

Referring to FIG. 3b, it illustrates a schematic circuit diagram of a half-bridge flyback power converter where the magnetized energy $\epsilon_P$ stored in the transformer 55 is transmitted to the secondary circuit through the secondary winding $N_S$ when the high-side switch 30 and the low-side switch 35 are both switched off. In the meantime, the bulk capacitor 60 is charged with the energy $\epsilon_P$ and $\epsilon_I$ through the flyback diodes 25 and 26.

When the input voltage $V_{IN}$ is higher than a voltage $V_B$ across the bulk capacitor 60, the forward diode 20 is reverse-biased. Therefore, a switching current is only supplied from the input voltage $V_{IN}$. The forward diode 20 facilitates to combine the input voltage $V_{IN}$ with energy of the bulk capacitor 60. When the input voltage $V_{IN}$ is lower than the voltage $V_B$ of the bulk capacitor 60, the energy stored in the bulk capacitor 60 will be used to power the secondary circuit. Regardless of the energy in the leakage inductor of the transformer 55, a turn-ratio of the transformer 55 and an output voltage $V_O$ of the power converter can determine the voltage $V_B$ across the bulk capacitor 60. The voltage $V_B$ is given by, $$V_B = \frac{N_P}{N_S} \times V_O \tag{4}$$

Figure 4:
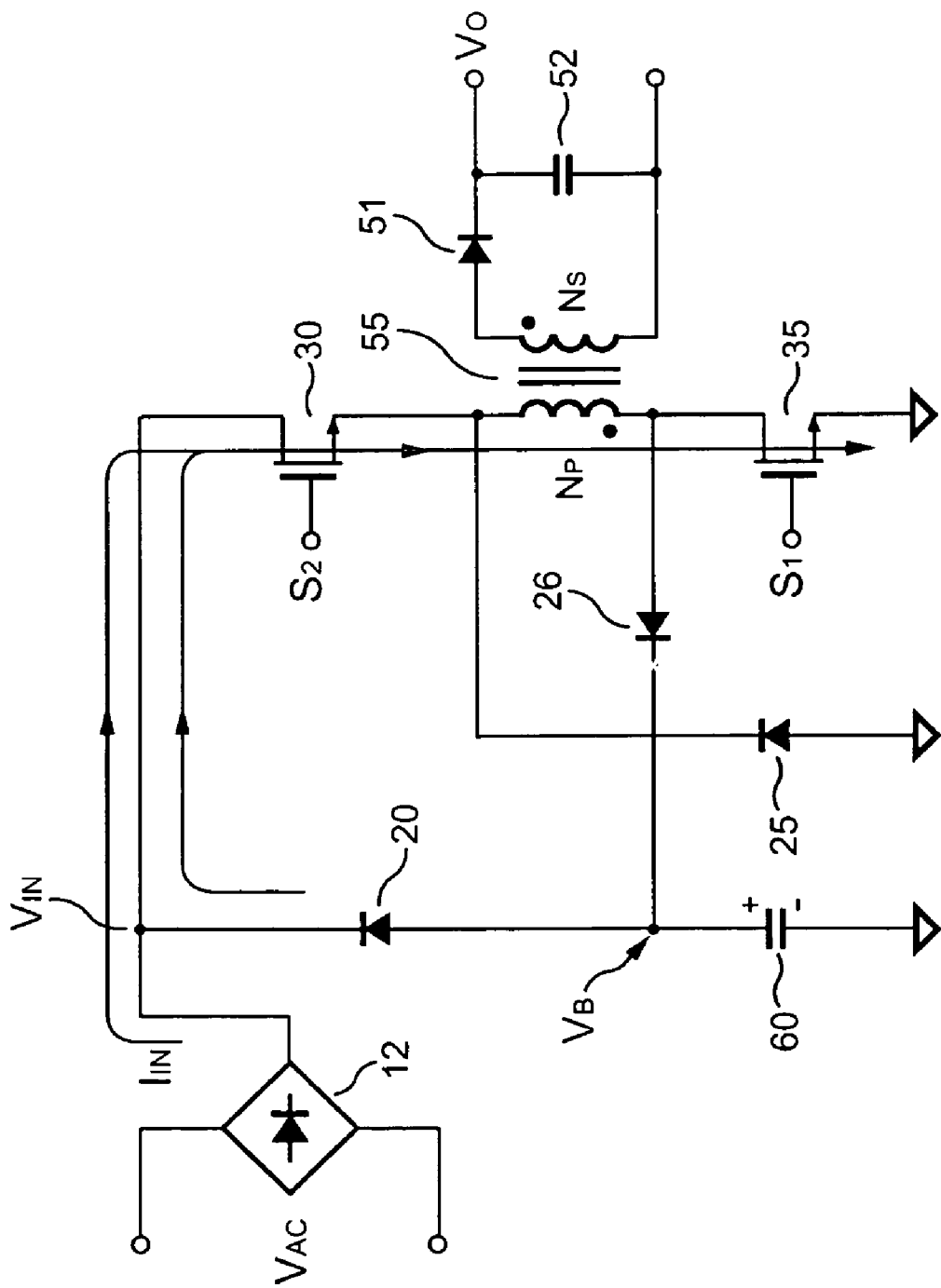
FIG. 4 is a schematic circuit diagram illustrating the current flow of the high-side switch and the low-side switch of a half-bridge flyback power converter when an input voltage is lower than a voltage across a bulk capacitor according to one embodiment of the present invention.

Referring to FIG. 4, it illustrates a schematic circuit diagram of a half-bridge flyback power converter, wherein the current flow of the high-side switch 30 and the low-side switch 35 thereof are depicted. The forward diode 20 facilitates to combine the switching current from input voltage $V_{IN}$ and the bulk capacitor 60.

In the half-bridge flyback power converter according to the embodiment of the present invention, the energy of the leakage inductor is stored in the bulk capacitor 60. No snubber component is required for dissipating the energy of the leakage inductor. The energy of the leakage inductor is recycled for powering the secondary circuit. Therefore, the efficiency of the power converter is improved. Moreover, the input voltage $V_{IN}$ and the bulk capacitor 60 clamp the operating voltage of the high-side switch 30 and the low-side switch 35. The voltage stress is thus reduced.

According to the circuit topology of the present invention, no inrush current is generated. The high-side switch 30 blocks a path from the input voltage $V_{IN}$ to the bulk capacitor 60. The bulk capacitor 60 is only charged with the magnetized energy $\epsilon_P$ and the leakage inductor energy $\epsilon_I$, such that a negative temperature coefficient (NTC) thermistor is not required, and further the efficiency and the reliability of the power converter are improved.

While the present invention has been particularly shown and described with reference to preferred embodiments thereof, it will be understood by those skilled in the art that various changes in form and details may be made therein without departing from the spirit and scope of the present invention as defined by the appended claims.

What is claimed is:

1. A half-bridge flyback power converter, comprising:
    a transformer, having a primary winding and a secondary winding, wherein said secondary winding is coupled to a secondary circuit; wherein a first terminal of said primary winding and a first terminal of said secondary winding have same polarity;
    a high-side switch;
    a low-side switch, wherein said high-side switch is coupled between an input voltage and a second terminal of said primary winding; wherein said low-side switch is coupled between said first terminal of said primary winding and a ground reference level;
    a first flyback diode, wherein an anode of said first flyback diode is coupled to said ground reference level; wherein a cathode of said first flyback diode is coupled to said second terminal of said primary winding;
    a second flyback diode, having an anode coupled to said first terminal of said primary winding;
    a bulk capacitor, wherein a positive terminal of said bulk capacitor is coupled to a cathode of said second flyback diode; wherein a negative terminal of said bulk capacitor is coupled to said ground reference level; and
    a forward diode, having a cathode coupled to said input voltage and an anode coupled to said positive terminal of said bulk capacitor.

2. The half-bridge flyback power converter as recited in claim 1, wherein said high-side switch and said low-side switch periodically conduct said input voltage to said primary winding of said transformer in response to at least a control signal.

3. The half-bridge flyback power converter as recited in claim 1, wherein when said high-side switch and said low-side switch are switched off, energy stored in said transformer is transmitted to said secondary circuit and serves to charge said bulk capacitor through said first flyback diode and said second flyback diode.

4. The half-bridge flyback power converter as recited in claim 1, wherein said forward diode facilitates to combine said input voltage with a voltage of said bulk capacitor; wherein when said input voltage is lower than a voltage across said bulk capacitor, energy stored in said bulk capacitor serves to power said secondary circuit.

5. The half-bridge flyback power converter as recited in claim 1, wherein energy of the leakage inductor of said transformer is stored in said bulk capacitor when said high-side switch and said low-side switch are switched off.

6. The half-bridge flyback power converter as recited in claim 1, wherein said bulk capacitor is only charged by magnetized energy and leakage inductor energy of said transformer.

* * * * *